UNITED STATES PATENT OFFICE.

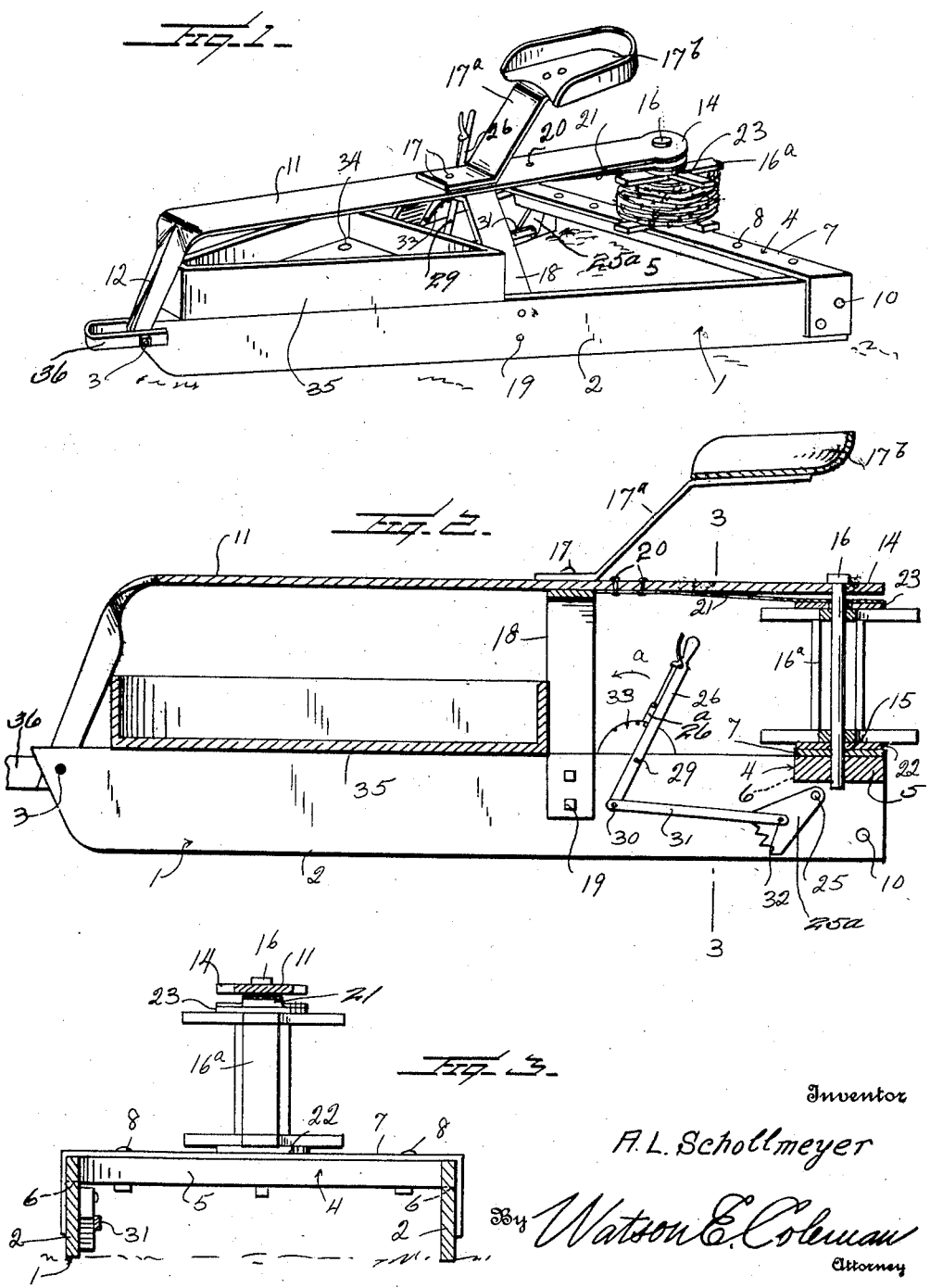

ALBERT L. SCHOLLMEYER, OF KILLDEER, NORTH DAKOTA.

FENCE-WIRE-CARRYING RIG.

1,329,860.  Specification of Letters Patent.  Patented Feb. 3, 1920.

Application filed June 13, 1919. Serial No. 305,162.

*To all whom it may concern:*

Be it known that I, ALBERT L. SCHOLLMEYER, a citizen of the United States, residing at Killdeer, in the county of Dunn and State of North Dakota, have invented certain new and useful Improvements in Fence-Wire-Carrying Rigs, of which the following is a specification, reference being had to the accompanying drawings.

This invention relates to an improved fence wire carrying rig or apparatus, particularly adapted for use in connection with wire fence construction.

Heretofore in constructing wire fences, it has been necessary to carry the reel of fence wire in a cart or on a wagon, when stringing the wire from post to post. This method has many disadvantages and inconveniences, for instance, it is awkward and inconvenient to apply the wire from the reel or spool, while in the cart or on the wagon, down to a position so that it can be connected to the posts. In this method the wire becomes entangled, more or less, and when making corners, the wire is very apt to get tangled upon some object or on the wheels of the cart, and the wire therefore will not unreel evenly. Furthermore, it has been found very difficult to go over rough and hilly ground with a cart or a wagon, across the fields and through the timber land, therefore, with such a method, the construction of a wire fence is very expensive, particularly for the labor used in connection therewith, owing to it being necessary to utilize the work of three or four or possibly five men.

Therefore, the invention aims to avoid these many difficulties, disadvantages, and inconveniences, and to accomplish this result the invention affords a rig for carrying a reel or spool of wire, and adapted to be drawn over the ground by a single draft animal, so that the reel or wire can be drawn very close to the line of posts, so that the wire may readily and freely be pulled or reeled from the spool and very conveniently applied to the posts.

The invention further aims to provide a rig consisting of a skeleton framework and including runners, arranged V-shaped, so that the rig may ride on the ground.

The invention further aims to provide a rig frame of this general character, constructed, whereby a suitable tool box may be supported thereon, for the purpose of carrying various tools used in connection with constructing wire fences.

The invention further aims to provide improved means for supporting the reel or spool of wire in a vertical position on the rig, so that the wire may be easily reeled or pulled therefrom, without becoming entangled, particularly when drawing the rig around a corner, post or tree, and also to permit the wire to easily pass from the reel or spool to the fence posts.

The invention further aims to provide means, such as washers, above and below the reel or spool, to permit of a free revoluble movement of the spool, but not to an extent as to permit the wire to spring from the reel or spool or become loose thereon, but to permit the spool or reel to freely rotate without catching.

A further object of the invention is the provision of means, such as a leaf spring, to offer sufficient resistance on the end of the spool, so as to retard it sufficiently, as to prevent the wire from leaving the spool or reel too rapidly, that is to an extent as to spring or spread on the surface of the reel or spool, in other words to prevent the spool from spinning or turning too rapidly.

The invention further aims to provide a rig that may ride over rough and hilly ground, through brush, down ditches or gulleys, or along the side of a hill without turning or tipping over, as would be the case in a cart or the like.

The invention further aims to provide a brake mechanism, for the purpose of retarding the rig, when going down a hill too rapidly, and to hold the rig on the hillside.

The invention further aims to provide a rig of this general character, which may be manufactured or constructed for a relatively low cost and sold at a reasonable profit, and also one which may be operated by a single man.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective of the improved rig, constructed in accordance with the invention.

Fig. 2 is a longitudinal sectional view on line 2—2 of Fig. 1.

Fig. 3 is a transverse vertical sectional view on line 3—3 of Fig. 2, looking in a direction toward the wire reel or spool.

Referring more especially to the drawings, 1 designates the frame of the rig as a whole. This frame comprises the side runners 2, which may be constructed of any suitable material, preferably wood, though not necessarily, for it is obvious that metal runners may be employed if desired. The forward ends of the runners are bolted together as shown at 3, and from where they are bolted together they diverge rearwardly, thereby affording a V-shaped frame. A wire reel supporting arch is provided. This arch 4 comprises a wood crosspiece 5, which engages recesses 6 on the upper edges of the rear ends of the runners, and a metal strap or plate 7. This metal strap or plate is bolted to the wood crosspiece, as shown at 8, and the ends of the metal strap or plate terminate in downwardly extending parts, which are bolted at 10 in several places, so as to reinforce and brace the rear ends of the runners relatively to each other, and in such a manner as to afford a rigid structure, in order to withstand the wear and tear that may be subjected to the rig, in riding over rough and hilly ground.

Fastened to the forward secured ends of the runners is an iron strap 11. This strap 11 is elongated, and its forward portion is split as shown at 12, and the parts caused to be formed by the split are twisted as illustrated and have their lower terminals fastened to the secured ends of the runners. This iron strap extends rearwardly, and is superimposed with relation to the runners, therefor. The greater portion of the body of said iron strip is practically in a horizontal plane, and has its rear end terminating in a bearing 14. Mounted in this bearing, and in a bearing 15 of the supporting arch is a vertical spindle 16, on which a drum, reel or spool 16ᵃ of fence wire is journaled. At a suitable location between the bearing and the forwardly down-turned portion of the strap 11, as indicated at 17 a V-shaped brace 18 is secured. The downwardly diverging side portions of the brace 18 are bolted or otherwise secured at 19 to the runners, thereby reinforcing the runners relatively to each other, and preventing the runners from spreading at points between their forward ends and their rear ends. Secured at 20 to the end portion of the longitudinally extending iron strap 11 is a leaf spring 21. The rear end of this spring conforms substantially to the shape of the rear end of the longitudinally extending iron strap. Interposed between the lower end of the reel or drum or spool and the arch is a washer 22, and arranged between the upper end of the spool or reel and the rear end of the leaf spring is a washer 23. These washers are provided for the purpose of preventing undue retardation of the reel or spool, as the wire is pulled or drawn therefrom. However, it will be noted that the rear end of the spring bears upon the upper washer sufficiently to hold the drum or spool from slipping too freely, that is rotating too freely when unreeling the wire, but not so that it would prevent the reel or drum from turning. The drum or reel is disposed vertically, so that the wire may be easily drawn therefrom, particularly when the rig is passing around a corner or around a tree or stump, thereby preventing the wire from catching on the supports of the reel, as would be the case if the reel were disposed horizontally. For instance, should the reel or drum be disposed horizontally, the wire would slip toward one end in advancing around a corner and thereby catch on a part of the frame.

A brake member 25ᵃ is pivoted to the inner face of one of the runners, as shown at 25. The lower end of the brake member is provided with teeth, to engage the ground. A lever 26 is pivoted to one of the runners, as shown at 29, and the lower end of the lever has pivoted to it as at 30 a link 31, which in turn is pivoted at 32 to the brake member. By moving the lever 26 in the direction of the arrow a, the brake member may be moved, so that its teeth at its lower end may engage the ground, thereby retarding the rig, preventing the same from moving too rapidly down a hill, and also holding the rig on a hillside. A segmental rack 33 is secured through the outer face of one of the runners in a position adjacent the lever 26, so that a hand grip operated dog 26ᵃ on the lever may engage any one of the teeth of the rack, to hold the lever in different adjusted positions, and hold the brake member in different positions.

A suitable tool box is bolted on the upper forward edges of the runner of the rig, as shown at 34. This tool box 35 is of a shape to correspond with the shape assumed by the runners, and is disposed between the forwardly downwardly turned part of the iron strap 11, and the brace 18.

In applying the fence wire, one end of the wire may be attached to one of the fence posts, after which the rig may be drawn by a single draft animal (which may be connected to the clevis 36 at the forward end of the rig) over the ground, adjacent the fence posts, and as the wire leaves or is pulled from the reel, the wire may be fastened to the posts. It will be seen that the rig may be drawn very close to the line of posts, particularly more so than a cart or a wagon, and since the reel is in a vertical position, the wire will have no difficulty in properly leaving the reel. If desired, the rig may be made stationary adjacent one of the fence posts, and the workman may take the other end of the wire and carry it manually, to the point where it is the aim to attach the wire, and then as he comes back toward the rig, the wire may be fastened to the various posts.

Also secured at 17 on the iron strap 11 is a set supporting spring 17$^a$ having a seat 17$^b$, on which the operator may be supported, when the apparatus is being driven over the soil. A suitable connection (not shown) may be connected to the clevis 36, and in any manner attached to a single draft animal, in which case the apparatus may be drawn from one place to another, when constructing the wire fences. As before stated, in this case, the operator is supported on the seat 17$^b$. However, it is obvious that the apparatus may be drawn by a saddled horse, by attaching the connection from the clevis 36 to the saddle horn of the saddle, and in this case the operator would ride the horse. Also, if desired, a suitable connection may be attached to the clevis 36, and in turn to the rear end of a wagon or other vehicle, or to the rear end of a sled or the like, for drawing the apparatus from one place to the other. Further, if desired, the rig can be fastened to a post or tree or any other object and the wire drawn from the reel or spool to any location desired, that is from one post to the other of the fence, and after the wire is arranged in position near the post, it can be raised and attached to the post in the usual manner. As will be understood, the wire supporting reel or spool which is shown is substantially the largest size on which fence wire is wound, and it is obvious that spools or reels of less height may be mounted upon the spindle, and in this case a plurality of washers similar to 23, may be employed, instead of one washer, as is shown, in order to take up the space between the leaf spring 21 and the spool. In fact, any number of washers 23 may be employed, when the spool or reel of less height than that which is shown is used.

The invention having been set forth, what is claimed as new and useful is:

1. In a fence wire reel carrying rig, the combination with a frame comprising side diverging runners, of an elongated member super-imposed above and intermediate the runners having its forward end secured to the forward end of the runners, a bracing arch connecting the rear ends of the runners, and a wire reel or spool supported between the rear end of said member and the arch.

2. In a fence wire reel carrying rig, the combination with a frame comprising side diverging runners, of an elongated member super-imposed above and intermediate the runners having its forward end secured to the forward end of the runners, a bracing arch connecting the rear ends of the runners, and a wire reel or spool supported between the rear end of said member and the arch, and means for providing friction between the reel and the rear end of the member to prevent the reel turning too freely.

3. In a fence wire reel carrying rig, the combination with a frame comprising side diverging runners, of an elongated member super-imposed above and intermediate the runners having its forward end secured to the forward end of the runners, a bracing arch connecting the rear ends of the runners, and a wire reel or spool supported between the rear end of said member and the arch, a brace between the member and the runners, and a manually operated brake carried by one of the runners adapted to engage the ground to retard the speed of the rig.

4. In a fence wire reel carrying rig, the combination with a frame comprising side diverging runners, of an elongated member super-imposed above and intermediate the runners having its forward end secured to the forward end of the runners, a bracing arch connecting the rear ends of the runners, and a wire reel or spool supported between the rear end of said member and the arch, and means for providing friction between the reel and the rear end of the member to prevent the reel turning too freely, a brace between the member and the runners, and a manually operated brake carried by one of the runners adapted to engage the ground to retard the speed of the rig.

5. In a fence wire reel supporting rig, the combination with a frame including diverging runners, of a bracing arch for the rear ends of the runners being transversely disposed, a super-imposed brace for the runners, a fence wire reel journaled between the rear end of the super-imposed members and the transverse bracing arch, and means interposed between the reel and the rear end of the super-imposed brace for preventing the reel from turning too freely.

6. In a fence wire reel supporting rig, the combination with a frame including diverging runners, of a bracing arch for the rear ends of the runners being transversely disposed, a super-imposed brace for the runners, a fence wire reel journaled between the rear end of the super-imposed members and the transverse bracing arch, and means interposed between the reel and the rear end of the super-imposed brace for preventing the reel from turning too freely, a tool box on the forward part of the upper edges of the runners, a brake carried by one of the runners adapted to engage the ground to retard the rig.

In testimony whereof I hereunto affix my signature in the presence of two witnesses.

ALBERT L. SCHOLLMEYER.

Witnesses:
C. A. BROWN,
I. L. DOHERTY.